United States Patent
Gembe

(10) Patent No.: US 9,235,785 B2
(45) Date of Patent: Jan. 12, 2016

(54) METHOD FOR CONTROLLING THE METERING OF INK IN A PRINTING PRESS, PRINTING SUBSTRATE, PRINTING PLATE AND PRINTING PRESS HAVING A DEVICE FOR CREATING HALFTONE IMAGE DATA

(71) Applicant: HEIDELBERGER DRUCKMASCHINEN AG, Heidelberg (DE)

(72) Inventor: Andreas Gembe, Leimen-Gauangelloch (DE)

(73) Assignee: Heidelberger Druckmaschinen AG, Heildelberg (DE)

( * ) Notice: Subject to any disclaimer, the term of this patent is extended or adjusted under 35 U.S.C. 154(b) by 0 days.

(21) Appl. No.: 14/320,821

(22) Filed: Jul. 1, 2014

(65) Prior Publication Data

US 2015/0002906 A1    Jan. 1, 2015

(30) Foreign Application Priority Data

Jul. 1, 2013  (DE) .......................... 10 2013 010 970

(51) Int. Cl.
| | |
|---|---|
| G06K 15/02 | (2006.01) |
| B41F 3/81 | (2006.01) |
| B41F 3/54 | (2006.01) |
| B41F 33/00 | (2006.01) |
| B41F 33/10 | (2006.01) |
| H04N 1/407 | (2006.01) |
| H04N 1/60 | (2006.01) |

(52) U.S. Cl.
CPC ................ *G06K 15/027* (2013.01); *B41F 3/54* (2013.01); *B41F 3/81* (2013.01); *B41F 33/00* (2013.01); *B41F 33/0045* (2013.01); *B41F 33/0081* (2013.01); *B41F 33/10* (2013.01); *G06K 15/1881* (2013.01); *H04N 1/4078* (2013.01); *H04N 1/6033* (2013.01)

(58) Field of Classification Search
None
See application file for complete search history.

(56) References Cited

U.S. PATENT DOCUMENTS

| | | | | |
|---|---|---|---|---|
| 5,818,604 | A | * 10/1998 | Delabastita et al. | ......... 358/3.19 |
| 5,870,529 | A | 2/1999 | Kistler et al. | |
| 6,684,790 | B2 | 2/2004 | Bestmann et al. | |
| 2008/0314268 | A1* | 12/2008 | Billmaier et al. | ............. 101/211 |

FOREIGN PATENT DOCUMENTS

| | | |
|---|---|---|
| DE | 4402723 A1 | 8/1995 |
| DE | 10201918 A1 | 7/2003 |
| DE | 102004058801 A1 | 6/2006 |
| DE | 102005027068 A1 | 12/2006 |
| DE | 102008045661 A1 | 4/2009 |
| DE | 102012004482 A1 | 9/2012 |
| EP | 0741028 A2 | 11/1996 |

\* cited by examiner

*Primary Examiner* — Paul F Payer
(74) *Attorney, Agent, or Firm* — Laurence Greenberg Werner Stemer; Ralph Locher

(57) ABSTRACT

A method for controlling the metering of ink in a printing press uses a control unit for comparing measured color values established on a print control strip to target color values and for controlling the metering of ink in the inking units of a printing press. The method is distinguished by the fact that the halftone of the measurement fields used for establishing the measured color values in the print control strip is independent of the halftone of the printed image. A printing substrate, a printing plate and a printing press having a device for creating halftone image data are also provided.

7 Claims, 2 Drawing Sheets

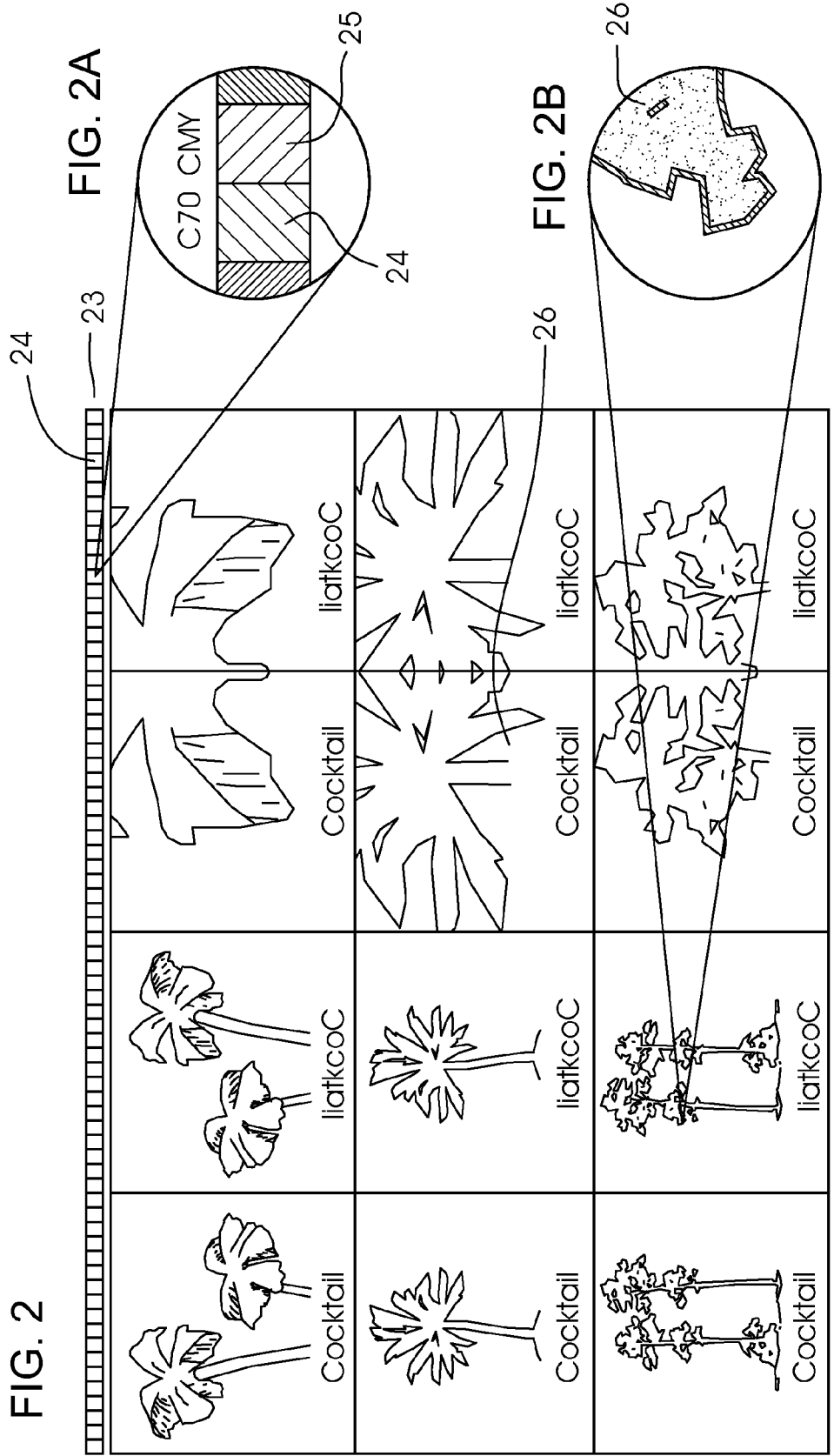

METHOD FOR CONTROLLING THE METERING OF INK IN A PRINTING PRESS, PRINTING SUBSTRATE, PRINTING PLATE AND PRINTING PRESS HAVING A DEVICE FOR CREATING HALFTONE IMAGE DATA

CROSS-REFERENCE TO RELATED APPLICATION

This application claims the priority, under 35 U.S.C. §119, of German Patent Application DE 10 2013 010 970.1, filed Jul. 1, 2013; the prior application is herewith incorporated by reference in its entirety.

BACKGROUND OF THE INVENTION

Field of the Invention

The present invention relates to a method for controlling the metering of ink in a printing press using a computer for comparing measured color values measured on a print control strip and target color values and for controlling the metering of ink in inking units of the printing press. Furthermore, the invention relates to a printing substrate, a printing plate and a printing press having a device for generating halftone image data of a printed image and a print control strip, which are applied to a printing substrate in the printing press.

The aim of a printing process is to reproduce an original or template on which a print job is based and the colors thereof with as much fidelity and color accuracy as possible. In order to achieve that aim, samples are taken at regular intervals from the completed printing substrates to compare them to the original. That may be done, for example, by comparing the digital data of the original to digital measured values of the printed substrates. If the actual values measured on the printed substrate are not within defined tolerances of the target values, the settings of the printing press need to be modified in a corresponding way to attain an optimum reproduction of the original. In lithographic offset printing, the decisive parameter to be adapted is the thickness of the ink film. A way of compensating color deviations between the original and the printed substrates is to modify the metering of the ink.

Such a process of controlling the application of ink in a printing press is known from European Patent Application EP 0 741 028 A2, corresponding to U.S. Pat. No. 5,870,529. The ink metering elements in the inking units thereof are set by a (closed-loop) control device, which continuously receives image data of the printed substrates from an image recording device. In order to calculate the ink metering settings, the control device has the possibility of using a number of (closed-loop) control algorithms and of automatically selecting and applying a suitable algorithm as a function of pre-definable parameters. That allows the control device to be adapted to the respective current circumstances. A disadvantage of that ink control process is that it is a closed system that does not easily allow further parameters to be factored in.

In addition, German Patent Application DE 10 2008 045 661 A1 discloses a process that factors in other influences in addition to those that can be compensated by the algorithms indicated in European Patent Application EP 0 741 028 A2, corresponding to U.S. Pat. No. 5,870,529. A plausibility check is proposed to prevent secondary effects that may result in color deviations in gray measurement fields such as slurring or doubling from causing erroneous ink control measures. A disadvantage of that method is, however, that register deviations nevertheless result in different color reproductions in gray measurement fields. Moreover, potential erroneous control measures cannot be definitively eliminated by a mere plausibility check of a color deviation.

SUMMARY OF THE INVENTION

It is accordingly an object of the invention to provide a method for controlling the metering of ink in a printing press, a printing substrate, a printing plate and a printing press having a device for creating halftone image data, which overcome the hereinafore-mentioned disadvantages of the heretofore-known methods and devices of this general type and which minimize the effects of metering-independent color reproduction errors in gray measurement fields to avoid erroneous ink control measures.

With the foregoing and other objects in view there is provided, in accordance with the invention, a method for controlling the metering of ink in a printing press, which comprises using a computer for comparing measured color values measured on a print control strip and target color values, and controlling the metering of ink in the inking units of a printing press. The method is distinguished by the fact that the halftone of the measurement fields used for taking color measurements in the print control strips is independent of the halftone of the printed image. Thus, the halftones of the measurement fields and of the printed image may be different or the same.

In accordance with another advantageous mode of the method of the invention, some of the measurement fields are gray measurement fields the halftone of which is invariably predefined. This is particularly advantageous with respect to gray field control because defect-resistant halftones may be defined for the gray measurement fields independently of the printed image.

In accordance with a further particularly advantageous mode of the method of the invention, the halftone of the measurement fields of the print control strip is highly insensitive to the influence of defects or disturbances in the printing process. In particular, the halftone is insensitive to doubling or slurring. As a result, metering-independent defects do not result in color reproduction changes in the measurement fields. This aspect effectively prevents erroneous ink metering control measures. A potential plausibility check as proposed by German Patent Application DE 10 2008 045 661 A1 is no longer necessary in the gray field control process because only metering-dependent color changes may occur in the measurement fields.

In accordance with a particularly advantageous further embodiment of the invention, the halftone of the measurement fields is a halftone created by stochastic or frequency-modulated screening. Extensive tests in the context of the invention have found that such halftones created by stochastic or frequency-modulated screening are highly insensitive to defects such as slurring and doubling.

With the objects of the invention in view, there is also provided a printing substrate, comprising a print control strip having measurement fields with a halftone being independent of a halftone of a printed image. Thus, the halftone of the printed image may, for example, be amplitude-modulated, whereas the defect-resistant halftone of the measurement fields of the print control strip may be created by frequency-modulated screening.

With the objects of the invention in view, there is furthermore provided a printing plate, comprising a print control strip having measurement fields with a halftone being independent of a halftone of a printed image. Thus, the halftone is suitable for producing the printing substrates described above.

With the objects of the invention in view, there is concomitantly provided a device for generating halftone image data of a printed image and a print control strip to be applied to a printing substrate in a printing press, the device being suitable for providing different halftones for a printed image and measurement fields of the print control strip. For this purpose, a prepress department brings together the image data and the control strip. In the process, a defect-resistant screen is defined for the measurement fields of the print control strip. In contrast, the halftone of the image to be printed is freely selectable by the operator. Subsequently, the image to be printed and the print control strip are screened or rasterized by a Raster Image Processor in a predefined way. In a lithographic offset printing process, the next step is to create a printing plate using the data created by the Raster Image Processor. In a digital printing process, the data are directly forwarded to a digital printing press through a communication link.

Other features which are considered as characteristic for the invention are set forth in the appended claims.

Although the invention is illustrated and described herein as embodied in a method for controlling the metering of ink in a printing press, a printing substrate, a printing plate and a printing press having a device for creating halftone image data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a plan view of a sheet having elements that have been printed in accordance with the invention;

FIG. 2A is an enlarged plan view of a gray measurement field and a measurement field; and FIG. 2B is an enlarged plan view of a section of a printed image.

DETAILED DESCRIPTION OF THE INVENTION

Figure 1:
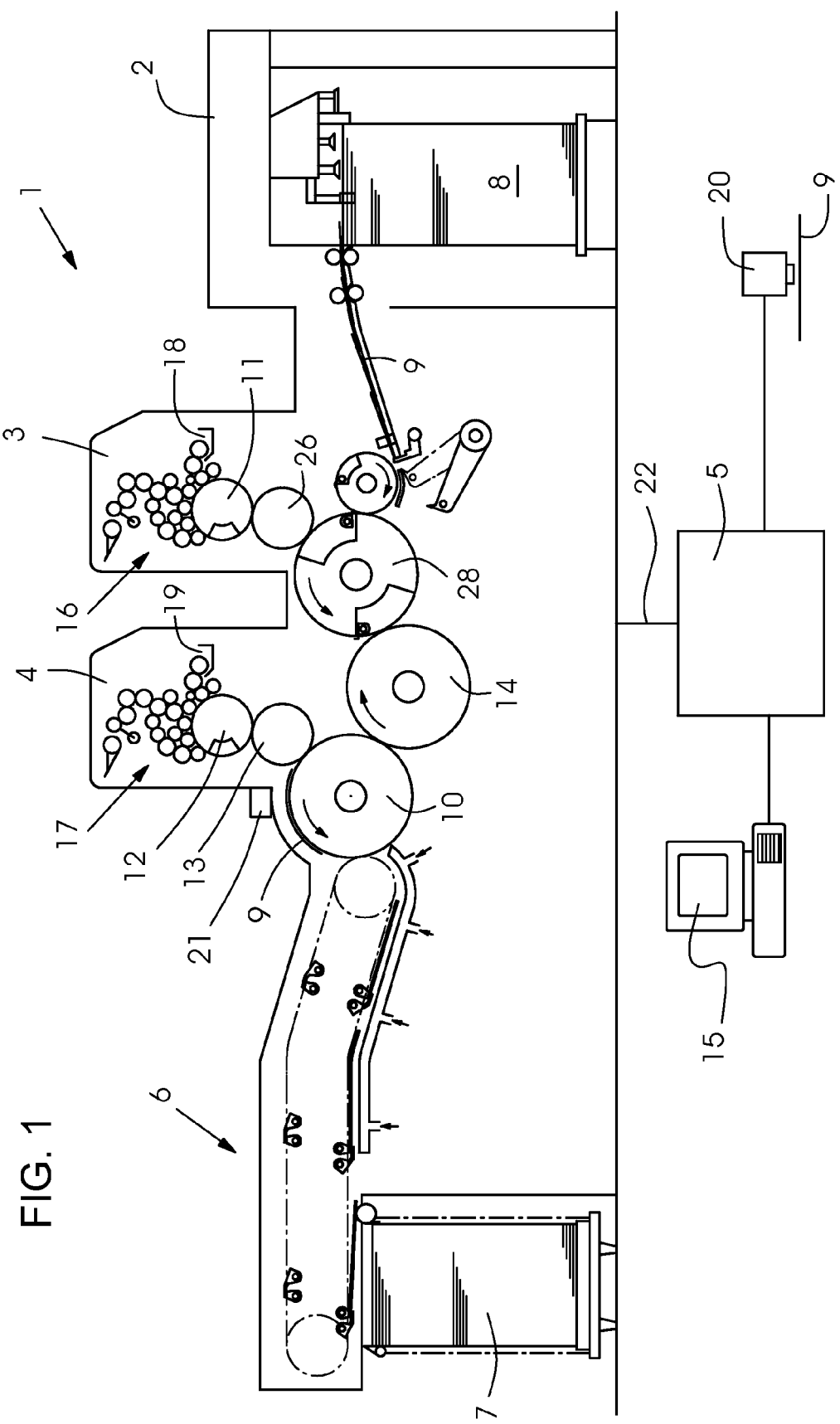
FIG. 1 is a diagrammatic, longitudinal-sectional view of a lithographic offset printing press connected to a control unit.

Referring now to the figures of the drawings in detail and first, particularly, to FIG. 1 thereof, there is seen a printing press 1 which includes two printing units 3, 4 for processing sheet-shaped printing substrates 9. The sheet-shaped printing substrates 9 are removed from a feeder stack 8 in a feeder 2 and are fed to the first printing unit 3 by a transport device. In the printing units 3, 4, blanket cylinders 13, 26 and impression cylinders 10, 28 form printing nips in which the sheet-shaped printing substrates 9 receive a printed image. A transport cylinder 14 conveys the sheets 9 between the two printing units 3, 4. Having exited the second printing unit 4, the sheets 9 that have received the completed printed image are transferred to a delivery 6, which deposits them on a delivery stack 7. Each printing unit 3, 4 includes an inking unit 16, 17, which applies printing ink onto printing plates disposed on the plate cylinders 11, 12. In order to control the properties of the printing ink, each of the two printing units 3, 4 includes a dampening unit 18, 19, which mixes the printing ink with dampening solution, thus allowing the properties of the printing ink to be influenced. The plate cylinders 11, 12 transfer the printing ink to the blanket cylinders 13, 26. In addition, an in-line measuring device 21 is provided at the exit of the second printing unit 4 for taking color measurements of the sheet-shaped printing substrates 9 that have been produced. The in-line measuring device 21 may be a RGB sensor, a densitometric device, or any other desired image inspection device. The in-line measuring device 21 does not need to be able to take absolute measurements of the colors on the sheet 9, but instead it merely needs to be able to detect the relative color progression on the sheets 9.

As is shown in FIG. 1, the in-line measuring device 21 is connected to a control unit or control computer 5 of the printing press 1 through a communication link 22. The control unit 5 of the printing press 1 is further connected to a screen 15 for making inputs and displaying the operating conditions of the printing press 1. The control unit 5 is further connected to a second measuring device 20 that may take absolute color measurements on the printing substrates 9. The printing substrates 9 may be taken from the delivery stack 7 and be measured by the measuring device 20. The second color measuring device 20 is a precision spectrophotometer such as those used in the color measuring systems known as ImageControl and AxisControl by Heidelberger Druckmaschinen AG. In the control unit 5, the measured color values obtained by the second color measuring device 20 may be compared to the measured color values of an original, in particular one from a digital prepress stage (not illustrated herein), and the deviations found in the process may be used for controlling the inking units 16, 17. For this purpose, a comparison between the target values obtained from the original and the actual color values measured by color measuring device 20 is made and the inking units 16, 17 of the printing press 1 are actuated in a corresponding way. The inking units 16, 17 have actuating drives for opening and closing ink metering elements to be able to control the application of ink. The actuating drives are controlled by the control unit 5, on which an ink control loop is implemented by using a uniform control variable. This may only work in an optimum way if the actual values measured on color measurement fields 24 (see FIG. 2) by the color measuring device 20 are without metering-independent color errors. For example, the color reproduction of the measurement fields 24 may be affected by slurring or doubling. Otherwise, erroneous ink metering control measures may be the result.

In order to avoid such erroneous control measures, a halftone that is used for gray measurement fields 25 on a control strip 23 is selected to be a defect-insensitive halftone, which is independent of a halftone of a printed image 26. For instance, the halftone for the printed image 26 may be an amplitude-modulated screen, whereas the halftone for the gray measurement fields 25 may be created by frequency-modulated screening, which is less sensitive to defects. Thus, the effects of defects on the actual color value of the gray measurement fields 25 are minimized and erroneous ink metering control measures are reduced.

FIG. 2 illustrates a printed print sheet 9. The print control strip 23, which is composed of individual measurement fields 24, is located at the upper margin of the print sheet 9. Some of these measurement fields 24 are gray measurement fields 25. The printed image 26 is located below the print control strip 23. FIG. 2A is an enlarged view of a gray measurement field 25 and a measurement field 24. The enlarged view shows that the halftone of the gray measurement field 25 is different from the halftone of the measurement field 24. FIG. 2B is an enlarged view of a section of the printed image 26. It can be seen that the halftone of the printed image 26 is different from the halftone of the gray measurement field 25.

The invention claimed is:

1. A method for controlling the metering of ink in a printing press, the method comprising the following steps:
    comparing measured color values established on a print control strip with target color values by using a control unit;
    controlling metering of ink in inking units of the printing press by using the control unit;
    independently providing a halftone of measurement fields in the print control strip used for taking color measurements and a halftone of a printed image; and
    the halftone of the measurement fields of the print control strip reacting insensitively to an effect of defects in a printing process and the defects being doubling or slurring.

2. The method according to claim 1, wherein the measurement fields are gray measurement fields and a halftone of the gray measurement fields is invariably predefined.

3. The method according to claim 1, wherein different measurement fields in the print control strip have different halftones.

4. The method according to claim 1, wherein the halftone that is insensitive to doubling or slurring is made by frequency-modulated screening.

5. A printing substrate, comprising:
    a printed image applied to the printing substrate, said printed image having a halftone;
    a print control strip applied to the printing substrate, said print control strip having measurement fields with a halftone being independent of said halftone of said printed image applied to the printing substrate; and
    said halftone of said measurement fields of said print control strip reacting insensitively to an effect of defects in a printing process and the defects being doubling or slurring.

6. A printing plate, comprising:
    a printed image having a halftone;
    a print control strip having measurement fields with a halftone being independent of said halftone of said printed image; and
    said halftone of said measurement fields of said print control strip reacting insensitively to an effect of defects in a printing process and the defects being doubling or slurring.

7. A raster image processor, comprising:
    a device for creating halftone image data encompassing a printed image and a print control strip having measurement fields to be applied to a printing substrate in the printing press;
    said device being configured to apply different halftones to the printed image and to the measurement fields of the print control strip; and
    the halftone of the measurement fields of the print control strip reacting insensitively to an effect of defects in a printing process and the defects being doubling or slurring.

* * * * *